(12) United States Patent
Reytier et al.

(10) Patent No.: US 8,424,878 B2
(45) Date of Patent: Apr. 23, 2013

(54) SEALED FLEXIBLE LINK BETWEEN A METAL SUBSTRATE AND A CERAMIC SUBSTRATE, METHOD FOR MAKING SUCH A LINK, APPLICATION OF THE METHOD TO SEALING HIGH TEMPERATURE ELECTROLYZERS AND FUEL CELLS

(75) Inventors: Magali Reytier, Grenoble (FR); Philippe Bucci, Engins (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 384 days.

(21) Appl. No.: 12/808,488

(22) PCT Filed: Dec. 22, 2008

(86) PCT No.: PCT/EP2008/068176
§ 371 (c)(1),
(2), (4) Date: Jun. 16, 2010

(87) PCT Pub. No.: WO2009/083539
PCT Pub. Date: Jul. 9, 2009

(65) Prior Publication Data
US 2010/0266931 A1 Oct. 21, 2010

(30) Foreign Application Priority Data
Dec. 24, 2007 (FR) ...................... 07 60340

(51) Int. Cl.
*F16J 3/00* (2006.01)
*H01M 8/24* (2006.01)
(52) U.S. Cl.
USPC ........... 277/634; 277/628; 277/650; 277/653; 277/654; 429/468; 429/469; 429/470; 429/507; 429/508; 429/509; 429/510
(58) Field of Classification Search .................. None
See application file for complete search history.

(56) References Cited

U.S. PATENT DOCUMENTS

| 4,468,042 A | * | 8/1984 | Pippert et al. ................. 277/638 |
| 4,642,864 A | | 2/1987 | Metcalfe et al. |

(Continued)

FOREIGN PATENT DOCUMENTS

WO 2005/106999 A1 11/2005

OTHER PUBLICATIONS

International Search Report issued Aug. 29, 2008 in French Application No. 0760340 filed Dec. 24, 2007.

(Continued)

*Primary Examiner* — Cynthia Lee
(74) *Attorney, Agent, or Firm* — Oblon, Spivak, McClelland, Maier & Neustadt, L.L.P.

(57) ABSTRACT

A device including a metal substrate and a ceramic substrate including a back-tapered groove separated from each other by a sealed flexible link. The link includes: a metal element including an end connected to the metal substrate and at another end housed in the groove of the ceramic substrate, the metal element being elastically deformable both in the groove along a direction radial to the groove and, in the separation space between the metal substrate and the ceramic substrate along the separation direction, and a joint-forming mass with a greater thermal expansion coefficient than that of the ceramic substrate and adhesively bonded to the end of the metal element housed in the back-tapered groove, the joint fitting with direct contact a portion of the height of convergent sidewalls of the groove.

9 Claims, 2 Drawing Sheets

U.S. PATENT DOCUMENTS

Figure 1:
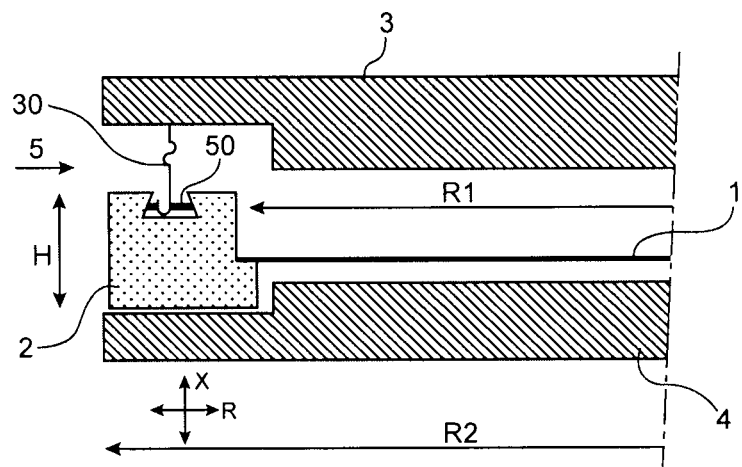

| | | | |
|---|---|---|---|
| 5,509,669 A * | 4/1996 | Wolfe et al. | 277/654 |
| 5,532,073 A | 7/1996 | Hirata et al. | |
| 6,302,402 B1 | 10/2001 | Rynders et al. | |
| 2003/0132270 A1 | 7/2003 | Weil et al. | |
| 2009/0085305 A1 * | 4/2009 | Demiroglu et al. | 277/637 |

OTHER PUBLICATIONS

Yeong-Shyung Chou, et al., "Material Degradation during Isothermal Aging and Thermal Cycling of Hybrid Mica Seal with Ag Interlayer under SOFC Exposure Conditions", Journal of the Electrochemical Society, vol. 153, No. 8, 2006, pp. A1591-A1598.

Paul A. Lessing, "A review of sealing technologies applicable to solid oxide electrolysis cells", Journal of Materials Science, vol. 42, 2007, pp. 3465-3476.

* cited by examiner

SEALED FLEXIBLE LINK BETWEEN A METAL SUBSTRATE AND A CERAMIC SUBSTRATE, METHOD FOR MAKING SUCH A LINK, APPLICATION OF THE METHOD TO SEALING HIGH TEMPERATURE ELECTROLYZERS AND FUEL CELLS

TECHNICAL FIELD

The invention generally relates to making a sealed flexible link between a metal substrate and a ceramic substrate.

It in particular relates to the seal between a metal interconnector and a ceramic support of an electrolysis cell also called an electrochemical cell.

It generally applies to ceramic-metal links operating at high temperature.

It advantageously applies to high temperature steam electrolyzers (usually and designated hereafter by HTE) used for producing hydrogen.

It may also be applied to fuel cells operating at high temperature (Solid Oxide Fuel Cell usually designated and hereafter by SOFC).

PRIOR ART

HTEs are electrochemical systems aiming at producing hydrogen from electrolysis of water between 600° C. and 1,000° C. They represent one of the most promising methods for producing hydrogen.

Thus, the applicant contemplates the rapid making of electrolyzers coupled to heat sources which do not generate greenhouse gases, notably of nuclear, geothermal or solar origin.

In order to reach competitive production costs, one of the options is to electrolyze water in the vapor phase and at a high temperature. For this technology, management of the gases and maintaining the seal over time are one of the major obstacles.

Indeed, for the contemplated temperatures, an electrochemical cell is used, consisting of a three-layer stack in ceramic, one drawback of which is its brittleness. The latter may limit the applicable forces. Further, as electrolyte materials have low ionic conduction properties at low temperature, it is therefore necessary to raise the operating temperature above 700° C. in order to limit ohmic losses. This generates difficulties for the strength of the metal materials, notably bipolar plates and joints. If oxidization appears as a major drawback of high temperatures for bipolar plates, the mechanical strength of the joints is even more a penalty.

Two great families of stacking architectures exist: one is a so-called tubular family and the other one is a planar family.

The tubular architecture provides simpler sealing possibilities: the bottom of the tube per se is a seal. But it has the drawback, among others, of generating high ohmic losses due to the length of the current lines.

The planar architecture provides more perspectives for high powers. The three-layer stacking in ceramic between two interconnectors is planar but the problems of seals are then more important than in the case of the tubular architecture. It is then necessary to guarantee a seal between each compartment, i.e. respectively between the anode interconnector and the portion of the cell containing the anode and between the cathode interconnector and the portion of the cell containing the cathode. By guaranteeing a seal, it is possible not to have recombination between the formed hydrogen and oxygen, but also between the actual system (electrolysis cell and anode and cathode interconnectors) and the exterior medium. The major problem posed for making these seals lies in the fact that they have to resist to temperature between metal materials and ceramic materials. These ceramic materials have a low thermal expansion coefficient (typically of the order of $10 \cdot 10^{-6}/°$ C.) and are brittle. The sealed link to be made should then be applied so as to protect the cell, should be sufficiently flexible for supporting the expansion difference and also have good creep resistance in order to guarantee long-lasting maintenance of the seal at high temperature.

The standard solutions for the seal of these systems are today based on a glass.

However, in the present state of development, this type of joint has a certain number of drawbacks. It is brittle below its glassy transition temperature and is likely to break if it is stressed, notably because of differential expansions. This is confirmed by the study of Paul A. Lessing published in the review <<Journal of Materials Science 42 (2007); pp 3465-34766>>.

Glass also generates a rigid link between the components of the stack, generating stresses during thermal transients. Further, when the seals are made on the basis of glass, disassembly of the components is difficult, or even impossible, without changing the cell. Further, as glass is sensitive to gravity, vertical or "ceiling" joints are delicate to consider. The glass may flow slowly and reduce the life-time of the assembly and not withstand the moderate pressures of a few bars. These pressures will have to be considered in the long run for a HTE with industrial application. Finally, the glasses are not always chemically compatible with the other components of the cell and of the interconnector(s) and may generate significant corrosion of the joint facings.

These drawbacks lead to the search for alternative sealing solutions which are notably mentioned in the study of Paul A. Lessing above.

Other solutions consist of brazing the metal of the interconnector on the ceramic. Now, obtaining the wetting of the metal of the interconnector on the ceramic as well as the heat expansion differences between both of these materials make this operation very difficult for large dimensions. Indeed, the cooling after solidification of the brazing solder regularly causes breakage of the ceramic.

Finally, other compressive joints based on mica, or simply metal, are proposed: they require exterior tightening to be controlled and to be maintained in temperature in order to obtain an efficient seal without breaking the cell during the heating.

Thus, in the prior art mentioned above, the principle of a compromise to be found between deformability of the metal joint in order to obtain the seal, and mechanical strength over time, is recalled. Notably, seeking flexibility of the joint by the structure more than by the material is mentioned, as well as a combination of elastic materials and of materials which easily plasticize, for fulfilling the seal function. This being the case, few results are proposed today for metal joints applicable in SOFCs and/or HTEs.

The object of the invention is therefore to propose a novel type of link between a metal substrate and a ceramic substrate, the seal of which is efficiently ensured at high temperature, typically above 700° C. and which is applicable in HTEs and/or SOFCs.

DISCUSSION OF THE INVENTION

For this purpose, the object of the invention is a device between a metal substrate and a ceramic substrate comprising a back-tapered groove separated from each other by a sealed flexible link.

According to the invention, the link comprises:
- a metal element including an end connected to the metal substrate and another end housed in the groove of the ceramic substrate, the metal element being elastically deformable both in the groove along a direction radial to the latter and, in the separation space between the metal substrate and the ceramic substrate along the separation direction,
- a joint-forming mass with a greater thermal expansion coefficient than the ceramic substrate and adhesively bonded to the end of the metal element housed in the back-tapered groove, the joint fitting with direct contact a portion of the height of the convergent sidewalls of the latter.

By <<adhesively bonded>>, it should be understood here and within the scope of the invention, that there is adhesion with the deformable metal element but no adhesion with the ceramic substrate. The adhesive according to the invention is a brazing solder when it is formed by a metal, such as silver.

Advantageously, above 700° C., the joint tightly fits a portion of the height of the convergent sidewalls of the back-tapered groove. Thus, when the adhesive is a brazing solder, such as silver, its thermal expansion coefficient being greater than that of the ceramic substrate, the brazing solder increases in volume and will be tightened against the convergent tilted walls of the back-tapered groove while plastically deforming. An efficient seal is thus undoubtedly obtained when the connecting link is used in an electrolyzer (HTE) or in a high temperature fuel cell (SOFC).

According to an advantageous embodiment, the metal element and the metal substrate form a part in a single piece. The metal of the metal substrate may moreover comprise ferritic steel or a nickel-based alloy.

According to an advantageous alternative, the end of the metal element housed in the groove of the ceramic element is hook-shaped, the interior of the hook being without the joint-forming mass so as to be elastically deformable along the radial direction of the groove.

According to another advantageous alternative, the metal element comprises an accordion folding portion different from the one housed in the groove of the ceramic substrate, the accordion being elastically deformable along the separation direction between the metal substrate and the ceramic substrate.

The ceramic substrate may be in zirconia, preferably yttriated zirconia.

The back-tapered groove may have a radial section in the shape of a dovetail or in the shape of a drop.

The mass joint is advantageously a brazing solder.

The invention also relates to a high temperature electrolyzer (EHT) comprising at least one link as described earlier, wherein the metal substrate is a cathode interconnector and the ceramic substrate is an electrolysis cell support.

According to an advantageous embodiment, the HTE may comprise at least two links as described earlier, wherein one of the two metal substrates is a cathode interconnector, the other one of the two metal substrates is an anode interconnector and wherein a single ceramic substrate is linked with the cathode and anode interconnectors while forming a support of a single electrolysis cell.

According to an advantageous embodiment, the ceramic substrate(s), the metal element(s), the back-tapered groove(s) and the mass(s) each have an annular shape, the flexible link being continuously achieved along the annular shapes. This embodiment is sought when one seeks to design HTEs in the form of a wafer.

In order to be sure not to degrade the seal during operation of the HTE, the joint(s) has (have) a melting temperature greater than the operating temperature of the electrolyzer by at least 50° C.

The invention also relates to a method for making a sealed flexible link between a metal substrate and a ceramic substrate in which the following steps are carried out:
- a/ making a back-tapered groove in the ceramic substrate,
- b/ linking a metal element comprising an elastically deformable portion along a radial direction and another elastically deformable portion along a longitudinal direction with the metal substrate,
- c/ filling a portion of the groove with a mass, the mass having a thermal expansion coefficient greater than that of the ceramic substrate,
- d/ inserting the elastically deformable portion along a radial direction in the groove until it penetrates the mass which is still in the liquid state,
- d'/ heating the mass until it passes into the liquid state,
- e/ cooling the mass down to a temperature causing its solidification and its necking,
- f/ relatively moving the metal and ceramic substrates apart in order to put the metal element in an intermediate elastically deformed state, the separation taking place until the mass fits with direct contact a portion of the height of the convergent sidewalls of the groove.

Advantageously, after step f/, a step for heating to a temperature above 700° C. is carried out at least once so that the joint-forming mass tightly fits a portion of the height of the convergent sidewalls of the back-tapered groove. Thus, the tightening sought according to the invention may be directly obtained during the rise in temperature of an HTE or of a fuel cell SOFC.

The mass is advantageously a brazing solder, preferably silver.

According to a characteristic of the method, the temperature at which step f/ is carried out may be of the order of room temperature.

The invention finally relates to a fuel cell operating at high temperature (SOFC) comprising a link as described above.

SHORT DESCRIPTION OF THE DRAWINGS

Figure 1A:
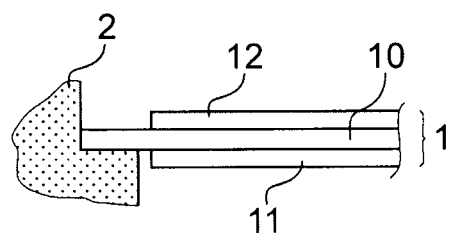

Other features and advantages of the invention will be better understood upon reading the detailed description made with reference to the following figures wherein:

FIG. 1 is a schematic transverse partial sectional illustration of a link according to the invention implemented in a high temperature electrolyzer (HTE), FIG. 1A is a detailed view of FIG. 1 schematically showing the structure of the electrolysis cell used, FIGS. 2A-2D are schematic illustrations also as transverse partial sectional views showing the different steps for making the link according to FIG. 1.

DETAILED DISCUSSION OF A PARTICULAR EMBODIMENT

Figure 2A:
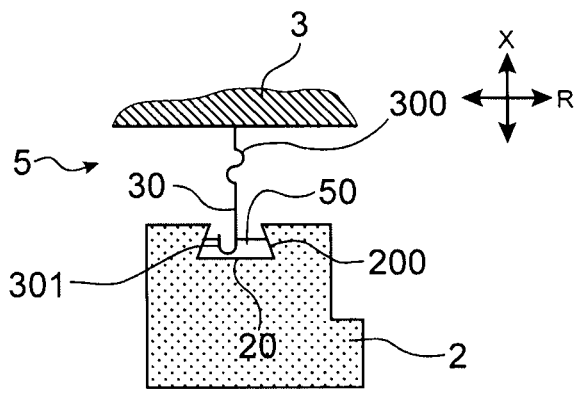
Figure 2B:
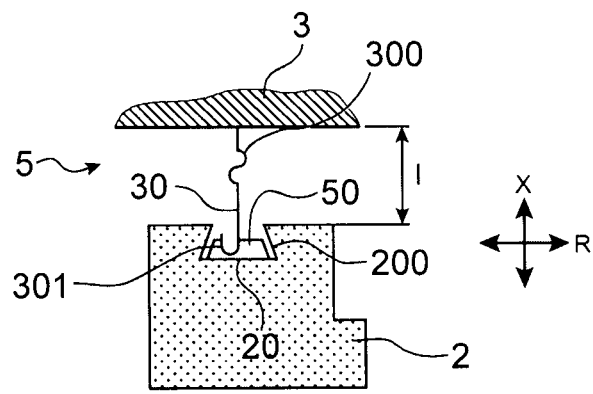
Figure 2C:
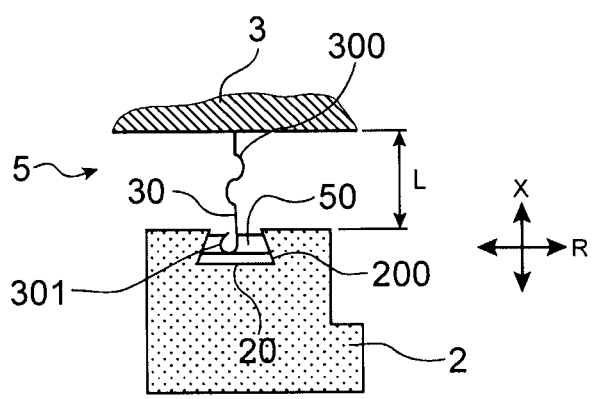
Figure 2D:
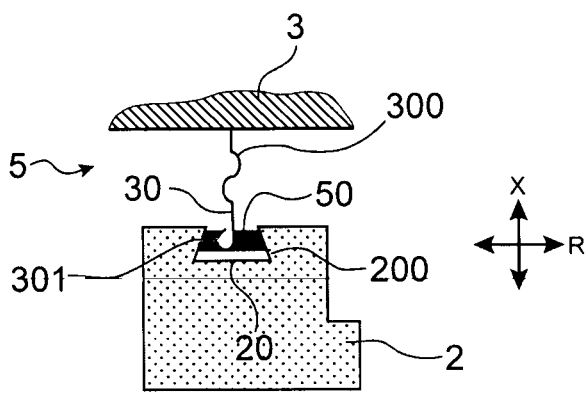

The sealing solution proposed is achieved by means of a link as schematically illustrated in FIGS. 1-2D in a high temperature electrolyzer HTE.

The high temperature electrolyzer HTE comprises an electrolysis cell 1 supported by a ceramic support 2 and sandwiched between a cathode interconnector 3 and an anode interconnector 4 and a sealed link according to the invention 5.

The electrolysis cell 1 as illustrated, comprises an electrolyte 10 directly supported by the ceramic support 2, and sandwiched between an anode 11 and a cathode 12 (FIG. 1A).

This link 5 includes a mechanical assembly by shrink fitting a metal joint 50 of the soft type with a strong expansion coefficient brazed to a metal portion 30 of the cathode interconnector 3 in a back-tapered groove 20 made in the supporting cell-holder in ceramic 2 promoting tightening in temperature. In a way, the sub-assembly formed by the metal joint brazed to the metal portion 30 of the cathode interconnector 3 forms the shrink fitted element while the ceramic cell holder forms the shrink fit.

The metal joint according to the invention is obtained by a brazing solder 50 adjoining the metal of the interconnector 30 but not reacting or only very little with the ceramic 2, i.e. not allowing definitive attachment of the brazing solder 50 to the ceramic 2.

The metal forming the brazing solder 50 fills the back-tapered groove 20 made in the ceramic holder 2. The metal portion 30 of the cathode interconnector 3 is positioned with an end 301 housed in the back-tapered groove 20 of the cell holder 2 (FIG. 2A). The introduction depth is calculated so that when the brazing solder is liquefied, it does not penetrate inside the end 301. The temperature of the assembly is then raised until melting of the mass (for example 1,050° C. for silver).

As mentioned subsequently, according to the invention, the metal portion 30 of the interconnector 3 is elastically deformable along both directions R and X, i.e. radially in its free end portion 300 housed in the groove 20 on the one hand, and longitudinally in its straight portion 301 along the separation direction between the cell holder 2 in ceramic and the interconnection portion of the cathode interconnector 3 on the other hand. The radial direction R is the direction which extends along a transverse section of the groove parallel to its base. The longitudinal direction X is the direction which extends along a transversal of the groove orthogonal to its base.

Once the cathode interconnector 3 is positioned, cooling is performed until solidification of the brazing solder with necking of said brazing solder 50 (FIG. 2B). The solidification and necking upon cooling causes play between the brazing solder 50 and the groove 20.

Next, after cooling and necking of the brazing solder, the position upon assembly at 20° C. with the whole of the parts forming the HTE allows the cathode interconnector 3 to move up again (from a distance 1 in FIG. 2B to a distance L in FIG. 2C) and therefore allows direct contact between the joint 50 and a portion of the height of the convergent tilted walls 200 of the groove 20 in the shape of a dovetail of the ceramic 2 (FIG. 2C). By displacing the interconnector 3 and brazing solder 50 assembly towards the top of the groove 20, the brazing solder 50 is thereby brought back into contact onto the tilted facings 200. According to the invention, flexible means, not shown here, arranged between the interconnector 3 and the cell 1 allow an electric contact to be guaranteed in spite of the vertical upward displacement. By this vertical displacement, the link portion 30 of the interconnector 3 is deformed elastically into an intermediate deformation state, so as to allow the joint 50 to cycle, or even to creep, subsequently and upon operating at high temperature.

Heating up to the operating temperature of the HTE involves a larger expansion of the metal brazing solder 50 than that of the ceramic 2. This causes a tight fit of the brazing solder 50 moreover brazed to the metal portion 30 in the dovetail-shaped groove 20 of the cell holder 2. The selection of the dimensions and materials should according to the invention lead to plasticization of this brazing solder in order to obtain the seal (FIG. 2D). During the rise in temperature for the operation, the large expansion of the brazing solder 50 causes it to be tightened against the groove 20 and to be plasticized as required for obtaining the seal.

The link portion 30 of the interconnector 3 has two flexibility areas: a hook at the end 301 giving radial flexibility and allowing the cell holder 20 to be not too stressed and a partly straight accordion 300 giving vertical flexibility so as to guarantee contact on the facings at an angle 200 in the case of creep of the brazing solder or of thermal cycling.

The advantage of the proposed solution is to obtain the seal by compression of a soft metal between the interconnector 3 and a ceramic cell holder 2 by shrink fitting also called press fitting. The expansion difference between the groove 20 and its contents is then used in order to obtain the tightening required for the seal while thus avoiding any exterior action by screws or other means.

With the relatively thick ceramic cell holder 2, it is possible to foresee more significant tightenings than on the actual electrolysis cell 1. The profile at an angle 200 of the groove 20 and the brazing solder 50 on the metal side 30 provides mechanical strength to the assembly at room temperature for transport for example, the tightening required for the seal only being obtained at high temperature.

The junction between the cell 1 and the cell holder 2 is achieved within the scope of implementation in a high temperature electrolyzer or a high temperature fuel cell, by another brazing solder or by a known seal based on glass. The mutual support between the cathode 3 and anode 4 interconnectors and the cell 1 is achieved by flexible means not shown here. Both of these junction and mutual support links may be made according to techniques known to one skilled in the art.

In the proposed solution, the seal is obtained by plasticizing a soft brazing solder 50 between the link portion 30 of the cathode interconnector 3 and the cell holder support 2. The forces required for plasticizing this brazing solder are obtained during heating by the differential expansion among the elements, the structure of the cell holder 2 and that of the link portion 30 of the interconnector 3 promoting this stress and its maintenance over time.

According to the illustrated embodiment, the cell holder is a massive part in yttriated zirconia. Any electrically insulating material resisting to a temperature of 1,050° C. (in the case of a silver brazing solder) may be used. With the cell holder support 2, the electrolyte of the cell 1 may be fixed on a support without stressing it upon heating (since this is the same material) and a sealing solution may be developed with millimetric dimensions, an inaccessible solution with the cell 1 alone because of its small thickness. Finally, with the support 2 provided according to the invention, it is possible to contemplate much larger tightening forces than those which may be contemplated on the cell alone 1, which allows the metal joint 50 to be plasticized and tightened in order to obtain the sought seal within the scope of the invention.

The shape of the back-tapered groove 20 may be achieved by rapid prototyping, or any other method with which this particular shape may be formed and sintered. As illustrated, with the dovetail 20, it is possible to obtain tightening by differential expansion of the groove and of its contents, but also to guarantee this tightening in the case of thermal cycling. The contact at each cycle is then accomplished on a different point by which at each cycle the brazing solder may be plasticized and the seal may be preserved upon heating up.

According to the illustrated embodiment, the material of the cathode interconnector 3 is ferritic steel with 22% of chromium commercially designated by Crofer 22APU, renowned for its resistance to corrosion in an SOFC atmosphere. Other stainless steels or alloys based on nickel may also be contemplated. It should then be made sure that the thickness of said cathode interconnector 3 is sufficiently small so as not to stress too much the cell holder 2 upon cooling, since the expansion coefficients of these other contemplated materials may also be quite different from that of the cell holder 2.

As mentioned earlier, the metal element contemplated according to the invention as a link portion 30, is elastically deformable by the hook 301 and the accordion 300 according to the illustrated embodiment. Such a thereby provided elastic deformation allows elastic energy to be stored, required for maintaining the seal if the brazing solder 50 creeps. This guarantees maintenance of the contact force between the brazing solder 50 and the convergent tilted edges 200 of the groove 20, both in the radial direction R and in the axial direction X. Further, with these flexibility elements 300, 301 the cell holder 2 may not be stressed too much during the strong temperature expansion of the brazing solder 50 at the operating temperature of the high temperature electrolyzer.

The metal joint 5 in the illustrated embodiment consists of a soft brazing solder with a strong expansion coefficient of the silver type. Any other metal alloy melting at a temperature above 800° C. and not reacting with the material of the cell holder, may be contemplated within the scope of the invention. Regardless of the material contemplated for the brazing solder 50, the latter should perfectly adhere to the metal of the link 30 of the interconnector 3 and may not react with the material of the groove 20, such as yttriated zirconia in the illustrated embodiment. Indeed the proposed solution does neither require attachment of the brazing solder 50 onto the ceramic, nor even requires the sliding of the joint 5 along the tilted flanks 200 of the groove 20 in order to increase the sought tightening within the scope of the invention. The selection of the brazing solder and of its melting temperature, of course depends on the targeted operating temperature for the sealed link to be made.

Other improvements may be contemplated without however departing from the scope of the invention.

Thus, the link according to the invention has been described with reference to the figures for sealing the cathode compartment and for not losing the hydrogen produced in a HTE. The link may just as well be reproduced on the anode side while making a symmetrical groove in the cell holder, and thereby achieving the seal on the oxygen side.

The link 5 as illustrated is in a HTE of a general annular shape and the dimensions are of the order of R1=60 mm, R2=70 mm and H=10 mm. It is just as well possible to make a connecting link of a generally rectangular or other shape with dimensions of same magnitude or different.

The invention claimed is:

1. A device comprising:
   a metal substrate and a ceramic substrate comprising a back-tapered groove separated from each other by a sealed flexible link,
   wherein the sealed link comprises:
      a metal element including one end connected to the metal substrate and another end housed in the groove of the ceramic substrate, the metal element being elastically deformable both in the groove along a direction radial to the groove and, in a separation space between the metal substrate and the ceramic substrate along a separation direction,
      a joint-forming mass with a greater thermal expansion coefficient than that of the ceramic substrate and adhesively bonded to the end of the metal element housed in the back-tapered groove, the joint-forming mass fitting with direct contact to a portion of a height of convergent sidewalls of the groove.

2. The device according to claim 1, wherein above 700° C., the joint-forming mass is tightly adjusted against a portion of the height of the convergent sidewalls of the back-tapered groove.

3. The device according to claim 1, wherein the metal element and the metal substrate form a part in a single piece.

4. The device according to claim 1, wherein the end of the metal element housed in the groove of the ceramic element has the shape of a hook, an inside of the hook being without the joint-forming mass so as to be elastically deformable along the radial direction of the groove.

5. The device according to claim 1, wherein the metal element comprises a folding accordion portion different from that housed in the groove of the ceramic substrate, the accordion portion being elastically deformable along the separation direction between the metal substrate and the ceramic substrate.

6. The device according to claim 1, wherein the metal of the metal substrate comprises ferritic steel or a nickel-based alloy.

7. The device according to claim 1, wherein the ceramic substrate is in zirconia, or is in yttriated zirconia.

8. The device according to claim 1, wherein the back-tapered groove has a radial section in a form of a dovetail or in a form of a drop.

9. The device according to claim 1, wherein the joint-forming mass is a brazing solder.

* * * * *